US007739716B2

(12) United States Patent
Takemura

(10) Patent No.: US 7,739,716 B2
(45) Date of Patent: Jun. 15, 2010

(54) NETWORK AV SYSTEM

(75) Inventor: Susumu Takemura, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 1112 days.

(21) Appl. No.: 10/988,038

(22) Filed: Nov. 12, 2004

(65) Prior Publication Data

US 2005/0141853 A1 Jun. 30, 2005

(30) Foreign Application Priority Data

Nov. 19, 2003 (JP) .............................. 2003-388988

(51) Int. Cl.
*H04N 7/173* (2006.01)
(52) U.S. Cl. ..................................... 725/93
(58) Field of Classification Search .................. 725/87, 725/90, 91, 93, 98, 101
See application file for complete search history.

(56) References Cited

U.S. PATENT DOCUMENTS

| 5,732,217 | A | * | 3/1998 | Emura | 725/90 |
|---|---|---|---|---|---|
| 5,895,915 | A | * | 4/1999 | DeWeerd et al. | 250/234 |
| 6,173,328 | B1 | * | 1/2001 | Sato | 709/231 |
| 6,226,443 | B1 | * | 5/2001 | Morioka et al. | 386/82 |
| 7,167,879 | B2 | * | 1/2007 | Sano et al. | 707/204 |
| 2002/0013948 | A1 | * | 1/2002 | Aguayo et al. | 725/91 |
| 2002/0039148 | A1 | * | 4/2002 | Yamamoto | 348/469 |
| 2003/0065824 | A1 | * | 4/2003 | Kudo | 709/250 |
| 2005/0086284 | A1 | * | 4/2005 | Sano et al. | 709/200 |

FOREIGN PATENT DOCUMENTS

| EP | 0 901 285 A1 | 2/1997 |
|---|---|---|
| EP | 901285 A1 * | 3/1999 |
| EP | 0 964 578 A2 | 12/1999 |
| EP | 964578 A2 * | 12/1999 |
| EP | 1 286 351 A2 | 2/2003 |
| JP | 07-284042 | 10/1995 |
| JP | 09-163308 | 6/1997 |
| JP | 09-312842 | 12/1997 |

(Continued)

OTHER PUBLICATIONS

European Search Report for corresponding Application No. 04027337.7 dated Mar. 17, 2005.
U.S. Appl. No. 10/498,181, filed Jun. 9, 2004.

*Primary Examiner*—Brian T Pendleton
*Assistant Examiner*—Cai Chen
(74) *Attorney, Agent, or Firm*—Renner, Otto, Boisselle & Sklar, LLP

(57) ABSTRACT

While a client reproduces a moving picture, and fast-forward reproducing is carried out in the process of reproducing a moving picture based on a frame, the client transmits a search request to a server. The server searches for the frame of I picture based on a condition in the search request in the fast-forwarding direction (reproducing direction) from the frame. The server uses a search table it has. As a result of the search, the server sequentially extracts frames of I picture and transmits them to the client. The client reproduces the frames every time it receives one of them. Therefore, a network AV system allows the memory capacity of a client to be reduced as much as possible and capable of special reproducing such as fast-forward reproducing and reverse-reproducing.

21 Claims, 16 Drawing Sheets

FOREIGN PATENT DOCUMENTS

| | | |
|---|---|---|
| JP | 10-276408 | 10/1998 |
| JP | 11-215464 | 8/1999 |
| JP | 2000-299841 | 10/2000 |
| JP | 2001-224032 | 8/2001 |
| JP | 2002-199344 | 7/2002 |
| JP | 2002-199370 | 7/2002 |
| JP | 2003-111048 | 4/2003 |
| WO | 03/102919 | 12/2003 |

* cited by examiner

FIG. 11

Fr1
- TIME=00:00:00.000
- OFFSET=0x00001000
- SIZE=0x00003000
- PICTURE TYPE=I

⋮

Fr50
- TIME=00:00:10.000
- OFFSET=0x00800000
- SIZE=0x00001000
- PICTURE TYPE=B

Fr51
- TIME=00:00:10.033
- OFFSET=0x00801000
- SIZE=0x00001000
- PICTURE TYPE=P

Fr52
- TIME=00:00:00.033
- OFFSET=0x00802000
- SIZE=0x00004000
- PICTURE TYPE=I

⋮

Fr71
- TIME=00:00:10.467
- OFFSET=0x00859200
- SIZE=0x00001800
- PICTURE TYPE=B

Fr72
- TIME=00:00:10.500
- OFFSET=0x00860000
- SIZE=0x00004000
- PICTURE TYPE=I

Fr73
- TIME=00:00:10.533
- OFFSET=0x00864000
- SIZE=0x00001000
- PICTURE TYPE=B

⋮

Fm-1
- TIME=00:45:30.000
- OFFSET=0x02860000
- SIZE=0x00001000
- PICTURE TYPE=B

Fm
- TIME=00:45:30.033
- OFFSET=0x02861000
- SIZE=0x00001800
- PICTURE TYPE=P

NETWORK AV SYSTEM

BACKGROUND OF THE INVENTION

1. Field of the Invention

The present invention relates to a network AV system, and more specifically, to a network AV system including a server and a client connected to the server through a network.

2. Description of the Related Art

A moving picture reproducing device such as a DVD (Digital Versatile Disc) player is capable of special reproducing such as fast-forward reproducing to reproduce a moving picture while fast-forwarding it, reverse-reproducing to reproduce a moving picture while reversing it. When moving picture data in a DVD is compressed by MPEG2, the moving picture data Vm consists of a plurality of frames as shown in FIG. 16. The plurality of frames can be divided into three kinds (I picture, B picture, and P picture) depending on how they are compressed. For fast-forward reproducing, for example, the DVD player extracts frames of I picture among the plurality of frames for reproducing.

Recently, network AV systems using a client-server system have been provided. WO 03/102919 discloses a network AV system having a server including a database that stores a plurality of pieces of moving picture data and a client connected to the server through a LAN (Local Area Network). The client requests the server to provide desired moving picture data, and the server distributes the requested moving picture data to the client in response. The client reproduces the moving picture based on the moving picture data distributed from the server. In the network AV system, the moving picture data is all stored in the server, and therefore the client does not have a hard disk for storing moving picture data. The client simply needs a minimum necessary memory for temporarily storing moving picture data distributed from the server. The network AV system of this kind is desirably capable of fast-forward reproducing and reverse-reproducing.

Japanese Patent Laid-Open No. 2003-111048 discloses a method of allowing the network AV system to carry out special reproducing such as fast-forward reproducing and reverse-reproducing. According to the disclosure of Japanese Patent Laid-Open No. 2003-111048, the client stores information related to moving picture data (information such as the array positions of the plurality of frames constituting the moving picture data) stored in the server. The client specifies a frame to be reproduced based on the information related to the moving picture data and requests the server to distribute the specified frame. In this case, the client needs a memory to store information related to the moving picture data, and therefore the memory capacity of the client cannot be reduced.

SUMMARY OF THE INVENTION

It is an object of the invention to provide a network AV system that allows the memory capacity of a client to be reduced as much as possible and capable of special reproducing such as fast-forward reproducing and reverse-reproducing.

A network AV system according to the invention includes a server and a client capable of connecting to the server. The server includes a moving picture storage device. The moving picture storage device stores moving picture data including a plurality of frames arranged in sequence. The client includes a search requester. The search requester transmits a search request including the frame condition of a frame to be searched for. The server further includes a searcher and a transmitter. The searcher sequentially searches the moving picture storage device for frames in time-series according to the search request. The transmitter transmits the frame found by the searcher. The client further includes a receiver and a reproducer. The receiver sequentially receives the transmitted frames. The reproducer reproduces a moving picture based on the received frames. Herein, the frame includes information such as the picture type, the size, and the array number of the frame. The frame condition is for example related to the picture type to be searched for, the size of the frame, or the array number of the frame.

In the network AV system according to the invention, frames according to a search request transmitted from the client are sequentially searched for in time-series, and the frames found by the search are transmitted to the client. If the frame condition of the search request is "I picture," the server sequentially searches for frames having I picture as a picture type and transmits the found frames to the client. If the frame condition of the search request transmitted from the client is "frame size not less than n," the server searches for frames having a size not less than n and transmits the found frames to the client.

In this way, when the client transmits a search request, the server sequentially searches for frames according to the search request in time-series and sequentially transmits the found frames to the client. The client can carry out special reproducing such as fast-forward reproducing and reverse-reproducing simply by reproducing a moving picture based on the sequentially transmitted frames. Therefore, the client does not need a memory for storing information related moving picture data, and needs only a minimum necessary memory for reproducing a moving picture.

Preferably, the search request further includes a search starting position that indicates an array position of a frame that the server starts to search for.

In this case, the client can specify the search starting position to the server.

Preferably, the search request further includes a frame search direction. Herein, the search direction is information to specify in which direction the array of the plurality of frames is to be searched for between the fast-forwarding direction and the reversing direction.

In this case, the client can select between fast-forward reproducing and reverse-reproducing.

Preferably, the search requester transmits a search request including the array position of the already received frame as the search starting position to the server every time the receiver receives the transmitted frame.

In this case, the client transmits a new search request every time the client receives a frame transmitted from the server. At the time, the client sets the received frame as the searching starting position. Consequently, fast-forwarding reproducing and reverse-reproducing can sequentially be carried out.

Preferably, the server further includes a table storage device. The table storage device stores a search table in which the array positions of the plurality of frames correspond to frame information related to the plurality of frames. The searcher searches the moving picture storage device for a frame according to the search request based on the search table. Herein, the frame information includes information related to the kind of the picture type, the size, and the array number of the frame.

In the network AV system, the server includes a search table in which the array positions of a plurality of frames correspond to frame information. The server searches for a frame according to the search request transmitted from the client based on the search table and transmits the frame found by the search to the client. Consequently, the server can raise the search speed. The search table is provided in the server but not in the client, and therefore the client does not need a memory for storing the server table. The client needs only a minimum necessary memory for reproducing a moving picture.

Preferably, the client further includes a reproducing speed selector. The reproducing speed selector selects a reproducing speed of the moving picture. The search requester determines the frame condition to be included in the search request based on the reproducing speed selected by the reproducing speed selector.

A moving picture consists of a plurality of frames arranged in sequence. Therefore, in order to raise the reproducing speed, the search requester sets the frame condition so that the intervals between the array positions of the frames to be sequentially obtained are large. For example, for normal fast-forward reproducing, all the I picture data is obtained, and for fast-forward reproducing at a speed twice as fast as the normal fast-forward reproducing, only the I picture data the 2N-th (N: natural number) from the search starting position is set as the frame condition. Conversely, in order to slow down the reproducing speed, the intervals between the frames to be sequentially obtained are reduced. In order to slow down the speed for normal fast-forward reproducing, the frame condition for odd-number search requests is set as I picture, while the frame condition for the even-number search requests is set as P picture. In this way, the reproducing speed can be controlled by setting the frame condition according to the reproducing speed.

Preferably, the frame information includes the picture types of the plurality of frames. The frame condition includes the picture type of the frame to be searched for.

In this way, the frames to be transmitted to the client are determined according to the picture type such as I picture.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a schematic view for use in illustration of frame transmitting processing in FIG. 9;

DETAILED DESCRIPTION OF THE PREFERRED EMBODIMENTS

Figure 1:
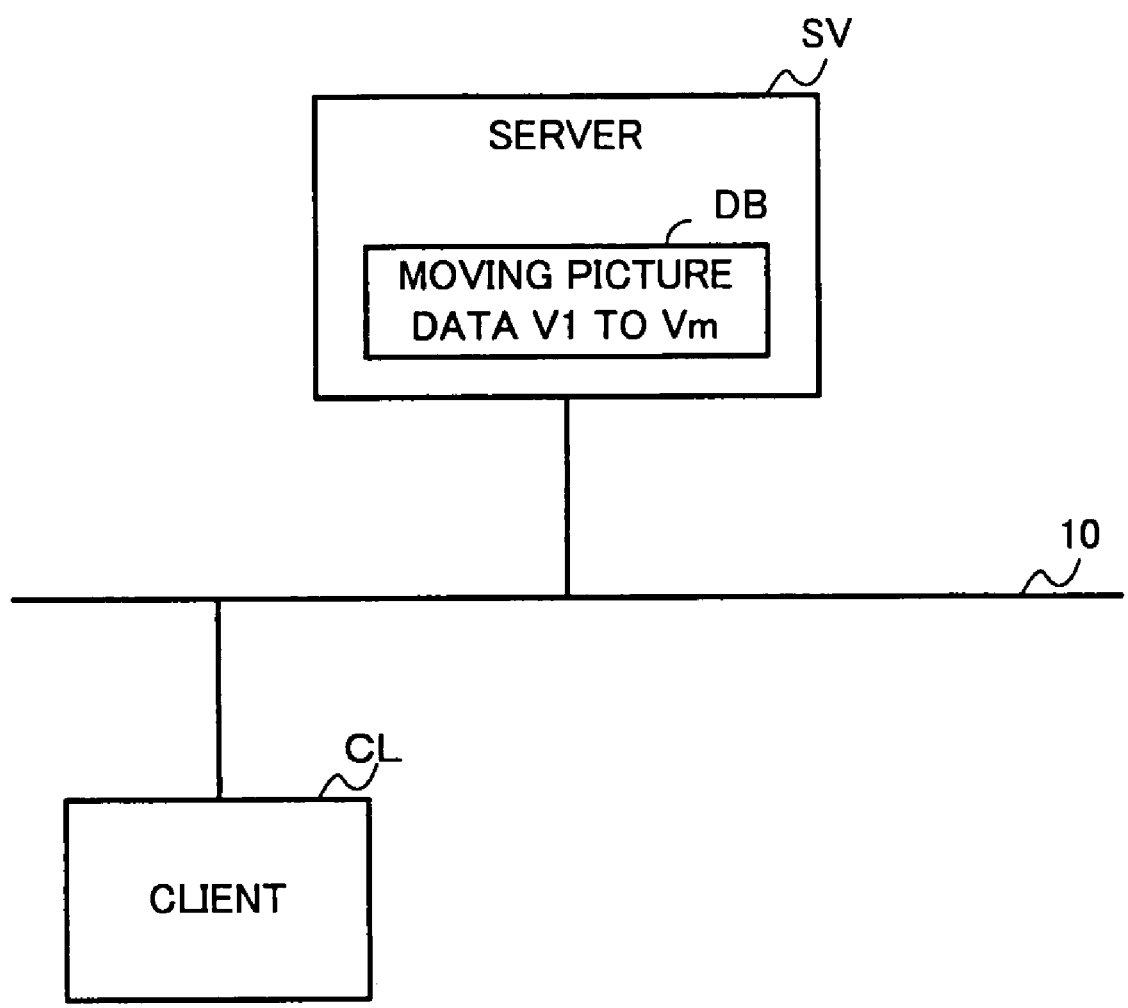
FIG. 1 is a functional block diagram of the configuration of a network AV system according to a first embodiment of the invention.

Now, an embodiment of the invention will be described in conjunction with the accompanying drawings in which the same or corresponding portions are denoted by the same reference characters and their description will not be repeated.

1. First Embodiment 1. 1. General Structure

Referring to FIG. 1, a network AV system 1 according to an embodiment of the invention includes a server SV and a client CL that can be connected with the server SV through a LAN (Local Area Network) 10. The server SV has a database DB including a plurality of pieces of moving picture data V1 to Vm (m: natural number).

The moving picture data Vm includes a plurality of frames arranged in sequence. The moving picture Vm is registered according to MPEG (Moving Picture Experts Group) 1 or MPEG2-PS (Program Stream). The server SV distributes moving picture data Vm based on a request from the client CL to the client CL. The client CL reproduces the moving picture data Vm distributed from the server SV.

Note that FIG. 1 shows one such client CL but there may be more than one client CL.

1. 1. 1. Server Structure

Figure 2:
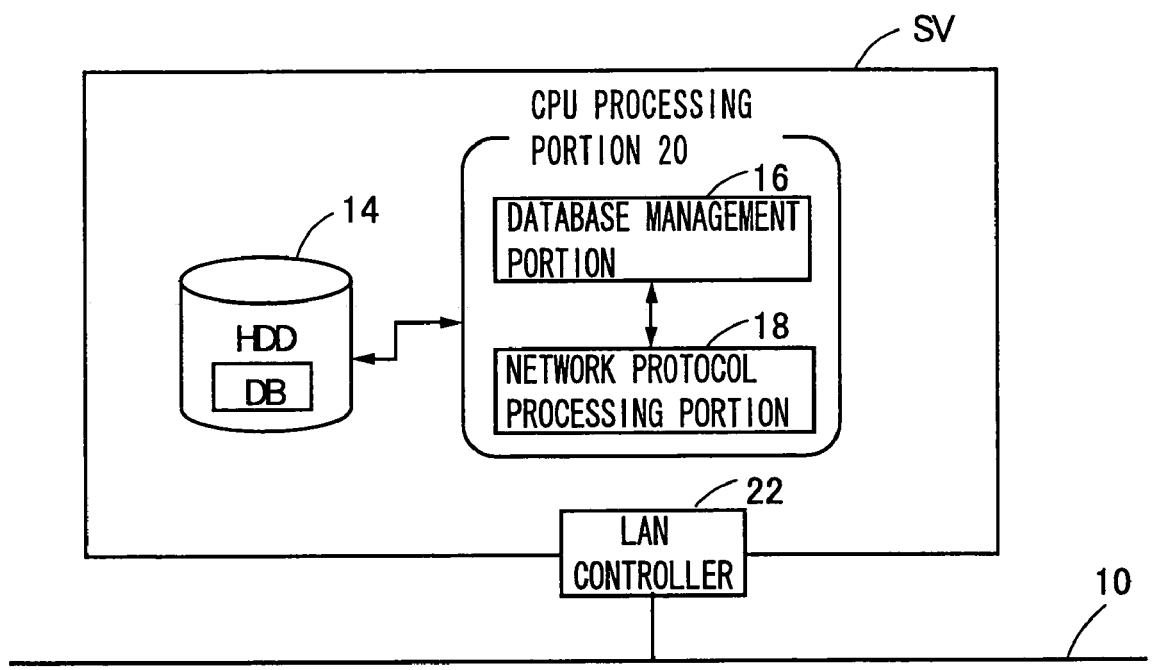
FIG. 2 is a functional block diagram of the configuration of the server shown in FIG. 1.

Referring to FIG. 2, the server SV includes an HDD (Hard Disk Drive) 14, a CPU processing portion 20 including a database management portion 16 and a network protocol processing portion 18, and a LAN controller 22 that transmits/receives a signal between the server SV and the LAN 10. The HDD 14 stores the database DB.

The database management portion 16 manages the HDD 14. More specifically, in response to a search request from the client CL, the database management portion 16 searches through the HDD 14 for the frames of the moving picture data Vm. The network protocol processing portion 18 protocol-processes input/output data.

The HDD 14 stores a moving picture list (Video List) VL given in Table 1.

TABLE 1 moving picture list VL
moving picture information moving picture information I1
moving picture information I2
.
.
.
moving picture information Im Referring to Table 1, the moving picture list VL includes a plurality of pieces of moving picture information I1 to Im. The moving picture information pieces I1 to Im are related to the plurality of pieces of moving picture data V1 to Vm stored in the database DB in the HDD 14. details of the moving picture information Im are given in Table 2.

TABLE 2 moving picture information Im

| | |
|---|---|
| videoID | moving picture data ID |
| filename | file name |
| title | moving picture title |
| size | data size |
| searchID | search table ID |

Referring to Table 2, a moving picture data ID that specifies the moving picture data Vm is stored in "videoID." The full path name of HDD 14 where the moving picture data Vm is stored is recorded in "filename." The title of the moving picture is recorded in "title." The data size of the moving picture data Vm is recorded in "size." The search table ID of a search table STm corresponding to the moving picture data Vm is recorded in "searchID." The search table STm is given in Table 3.

TABLE 3 search table STm

| | frame information | | | |
|---|---|---|---|---|
| frame No. | time | offset | size | picture type |
| Fr1 | 00:00:00.000 | 0x00001000 | 0x00003000 | I |
| Fr2 | 00:00:00.033 | 0x00004000 | 0x00001000 | B |
| . | . | . | . | . |
| . | . | . | . | . |
| . | . | . | . | . |
| Frn-1 | 00:45:30.000 | 0x02860000 | 0x00001000 | B |
| Frn | 00:45:30.033 | 0x02861000 | 0x00001800 | B |

The search table STm records a frame No. and frame information corresponding to the frame No. The frame No. corresponds to the array positions of the plurality of frames constituting the moving picture data Vm. For example, the frame No.=Fr1 represents the starting frame of the moving picture Vm, and the frame No.=Frn is a frame the n-th (n: natural number) from the start of the moving picture data Vm. The frame whose frame No.=Frn will be hereinafter referred to as "frame Frn."

The frame information includes "time," "offset," "size," and "picture type." For the "time," the time at which the frame is reproduced in the moving picture data Vm is recorded. For example, the "time" of the frame Fr1 is "0:00:00.000." For the "offset," the offset value of the starting data of the frame is recorded. For the "size," the size of the frame is recorded. For the "picture type," the picture type (I, B, P) of the frame is recorded.

The server SV stores client information CLI (Client Information) as shown in Table 4 in the HDD 14. The client information CLI is information related to the client CL.

TABLE 4 client information CLI

| | |
|---|---|
| flag | with or without connection |
| status | present status |
| firmwareid | firmware ID |
| hostname | client name |
| videoID | moving picture ID |
| searchID | search table ID |

Referring to Table 4, the term "flag" in the client information CLI indicates the presence/absence of connection with the server SV. The "flag" is set when there is connection and reset when there is no connection. The term "status" indicates the present status (operation state) such as reproducing, stop, fast-forward reproducing, and reverse-reproducing. The term "firmwareid" is a firmware ID indicating the version of firmware installed in the client. The term "hostname" indicates a client name provided to the client. When there are a plurality of clients CL connected to the server SV, the "hostname" differs among the clients CL. For the term "videoID," the moving picture data ID of the moving picture data Vm in the process of reproducing is recorded. For the "searchID," the search table ID of the search table STm corresponding to the moving picture data Vm being reproduced is recorded.

1. 1. 2. Client Structure

Figure 3:
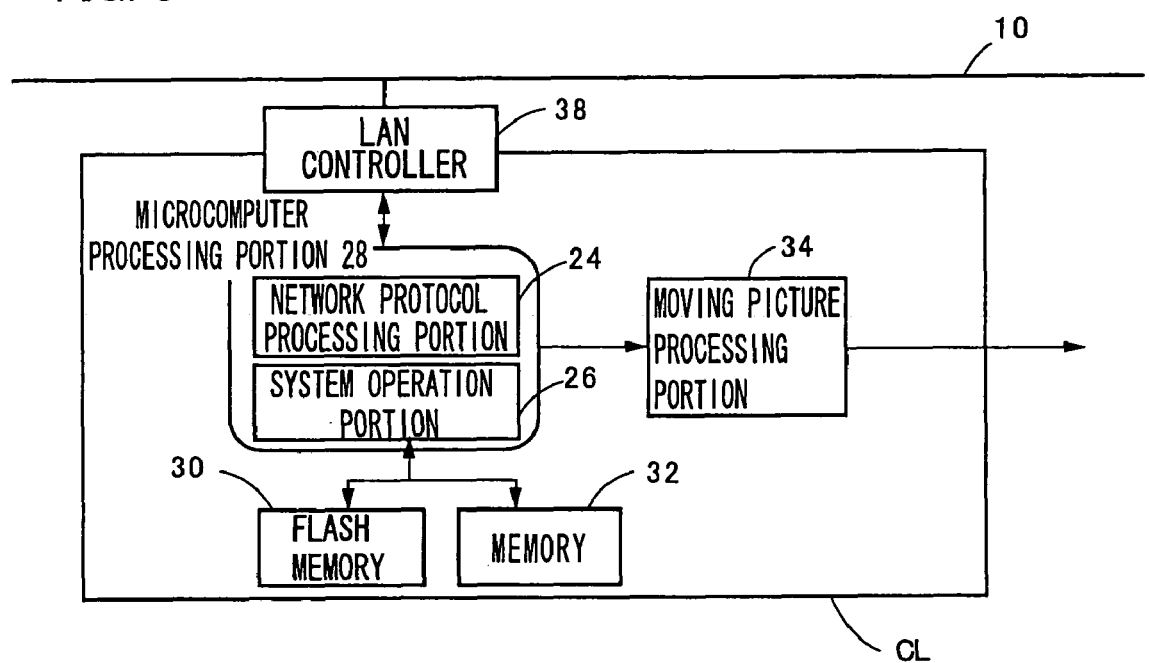
FIG. 3 is a functional block diagram of the configuration of the client CL shown in FIG. 1.

Referring to FIG. 3, the client CL includes a microcomputer processing portion 28 including a network protocol processing portion 24 and a system operation portion 26, a flash memory 30, a memory 32 that temporarily stores sequentially input moving picture data and sequentially outputs the data, a moving picture processing portion 34 that decodes compressed digital moving picture data into non-compressed digital moving picture data, and a LAN controller 38 that transmits/receives signals between the client CL and the LAN 10. The system operation portion 26 controls the client CL as a whole.

The client CL does not include an HDD for storing moving picture data Vm unlike the server SV.

1. 2. Operation

The operation of the network AV system will briefly be described.

Figure 4:
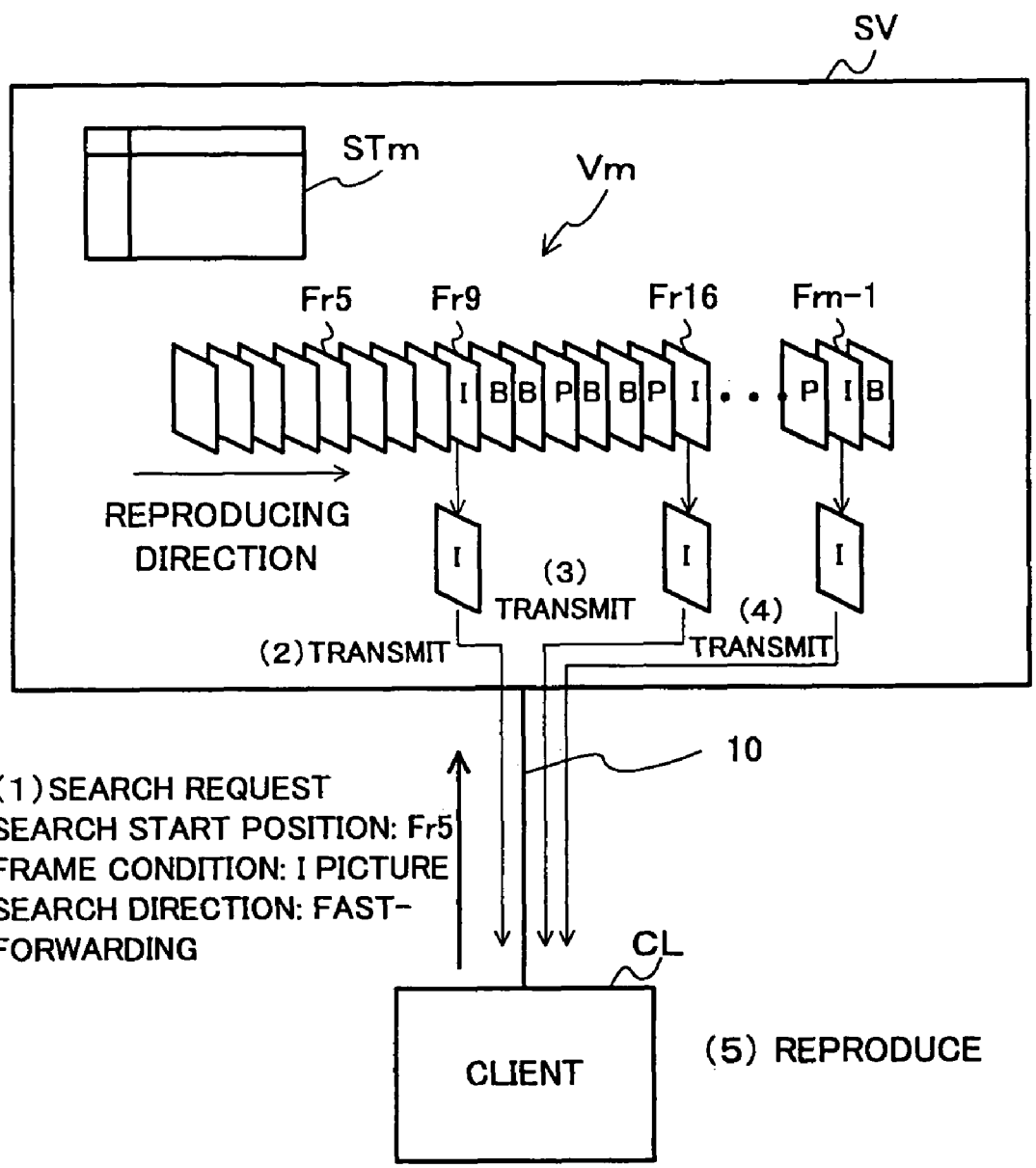
FIG. 4 is a schematic view for use in illustration of the operation of the network AV system shown in FIG. 1.

Referring to FIG. 4, when the client CL receives moving picture data Vm distributed from the server SV and is in the process of reproducing a moving picture based on the moving picture data Vm, and the user of the client CL selects "fast-forward reproducing" in the process of reproducing a moving picture based on the frame Fr5, the client CL transmits a search request to the server SV (1). At the time, the client CL requests the server SV to search in the fast-forwarding direction for frames Fr of I picture starting from the frame Fr5 and to transmit the found frames Fr by the search.

The server SV receives the search request and searches for frames Fr of I picture in the fast-forwarding direction (i.e., in the reproducing direction) from the frame Fr5. For the search, the server SV uses the search table STm. As a result of the search, the server SV extracts a frame Fr9 that is of I picture and transmits the frame to the client CL (2).

The server SV then continues to search for frames Fr of I picture in the fast-forwarding direction, and upon finding frames Fr16 and Frn-1 following the frame Fr9, the server SV sequentially transmits these frames Fr to the client CL (3)(4). The client CL reproduces the frames Fr9, Fr16, and Frn-1 every time the client receives one of the frames (5). As a result, the user of the client CL can view the fast-forward reproducing.

Now, the operation of the network AV system will be described in detail.

1.2.1. General Operation

Figure 5:
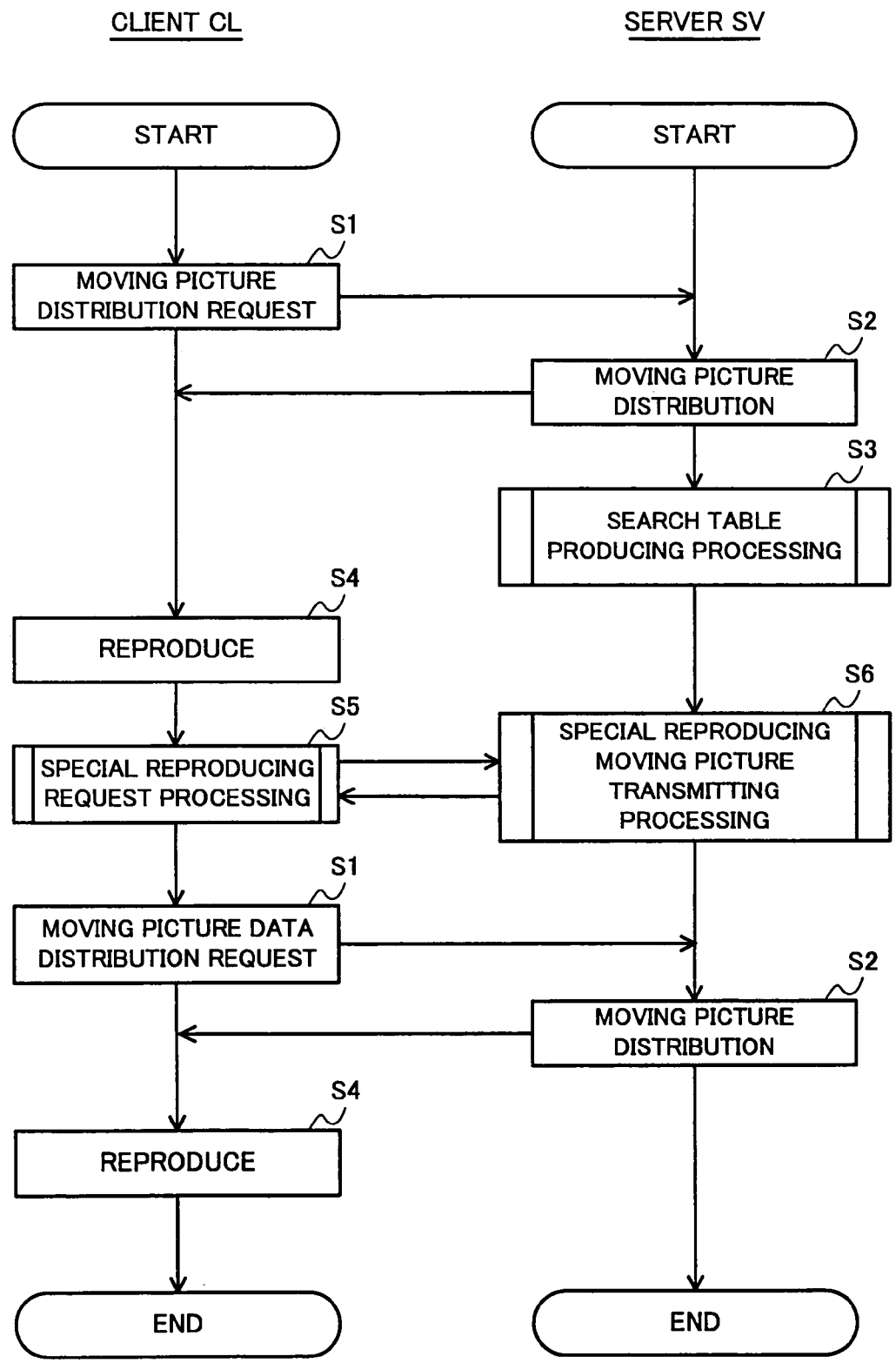
FIG. 5 is a flowchart for use in illustration of the operation of the network AV system shown in FIG. 1.

Referring to FIG. 5, when the user of the client CL desires to watch a desired moving picture, the user instructs the client CL to reproduce the desired moving picture. For example, a plurality of titles of moving pictures are displayed on the display (not shown) of the client CL, and the user selects the title of the desired moving picture using for example a remote, and instructs the client CL to reproduce the moving picture.

At the time, the client CL transmits a moving picture distribution request to the server SV (S1). The moving picture distribution request includes the title of the moving picture selected by the user. Upon receiving the moving picture distribution request, the server SV selects moving picture information Im in the moving picture list having the same "title" as the title of the moving picture transmitted in step S1, and determines moving picture data Vm to be distributed with the moving picture data ID in the selected moving picture information Im. After the determination, the server SV distributes the determined moving picture data Vm to the client CL (S2). The client CL receives the moving picture data Vm distributed from the server SV and reproduces it (S4).

The server SV carries out search table producing processing in parallel with step S2 (S3). In the search table producing processing, the server SV produces a search table STm for the moving picture data Vm selected by the user if the search table does not exist in the HDD14 of the server SV. The server SV has search tables STm for moving picture data Vm already distributed to the client CL among the moving picture data V1 to Vm stored in the HDD 14, but not for moving picture data Vm yet to be distributed to the client CL. Therefore, the server SV produces a search table STm corresponding to moving picture Vm at the time of transmitting the moving picture data Vm to the client for the first time (S3).

When the user of the client CL selects special reproducing such as fast-forward reproducing and reverse-reproducing while the client CL reproduces the moving picture based on the moving picture data Vm, the client carries out special reproducing request processing (S5), and the server SV carries out special reproducing moving picture transmitting processing (S6). More specifically, the client CL transmits a search request for special reproducing. The server SV sequentially transmits frames corresponding to the search request from the client CL based on the search table STm. The client CL reproduces the moving picture based on the frames sequentially transmitted from the server. In this way, the client CL can carry out special reproducing.

After the client CL carries out special reproducing up to the frame desired by the user, the user again selects reproducing of the moving picture. At the time, the client CL transmits a moving picture distribution request similarly to step S1 (S1). The server SV receives the moving picture distribution request and again distributes the moving picture data Vm (S2). The client CL reproduces the moving picture based on the distributed moving picture data Vm (S4).

In this way, the network AV system can reproduce moving pictures and carry out special reproducing. Now, the search table producing processing in step S3, the special reproducing request processing in step S5, and the special reproducing moving picture transmitting processing in step S6 will be described in detail.

1.2.2. Search Table Producing Processing

Figure 6:
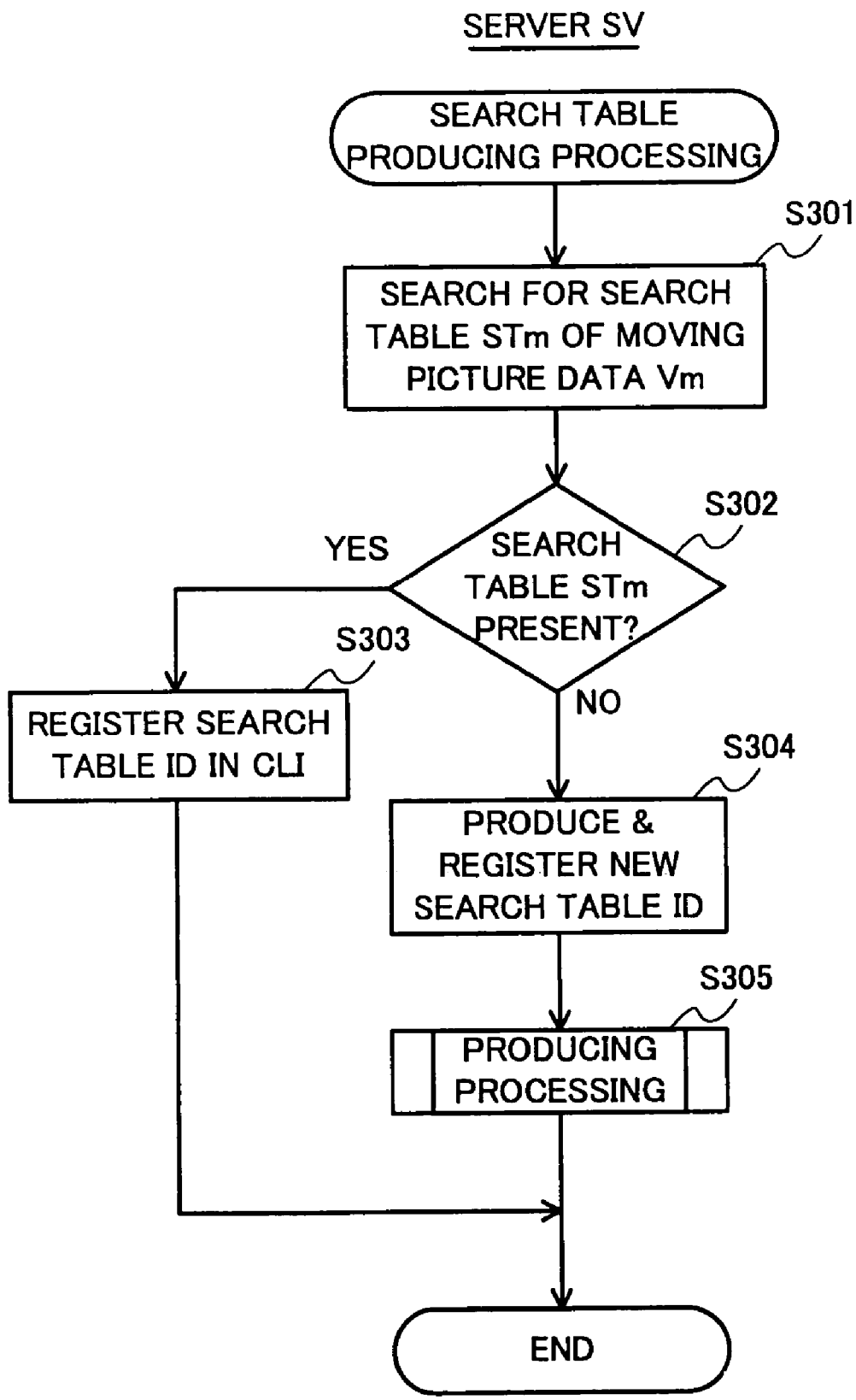
FIG. 6 is a flowchart for use in illustration of the operation in frame information selecting processing in step S3 in FIG. 5.

Referring to FIG. 6, the server SV determines whether there is a search table STm corresponding to moving picture data Vm to be transmitted to the client CL (S301). More specifically, it is determined whether the search table ID is recorded in "searchID" in the moving picture information Im of the moving picture data Vm. If the search table ID is recorded in "searchID" (S302), the server SV registers the search table ID in the "searchID" of the client information CLI (S303). In this way, the search table STm of the moving picture data Vm in the process of reproducing by the client CL can be specified.

Meanwhile, if the search table ID is not recorded in the "searchID" (S302), the server SV registers a new search table ID in the "searchID" of the moving picture information Im of the moving picture data Vm and in the "searchID" of the client information CLI as a preparation for producing the search table STm of the moving picture data Vm to be transmitted to the client CL (S304).

After the registration, the server SV produces the search table STm (S305). Now, the data structure of the moving picture data Vm stored in the HDD 14 in the server SV will be described and then the producing processing in step S305 will be described.

Data Structure of Moving Picture Data in HDD

Figure 7:
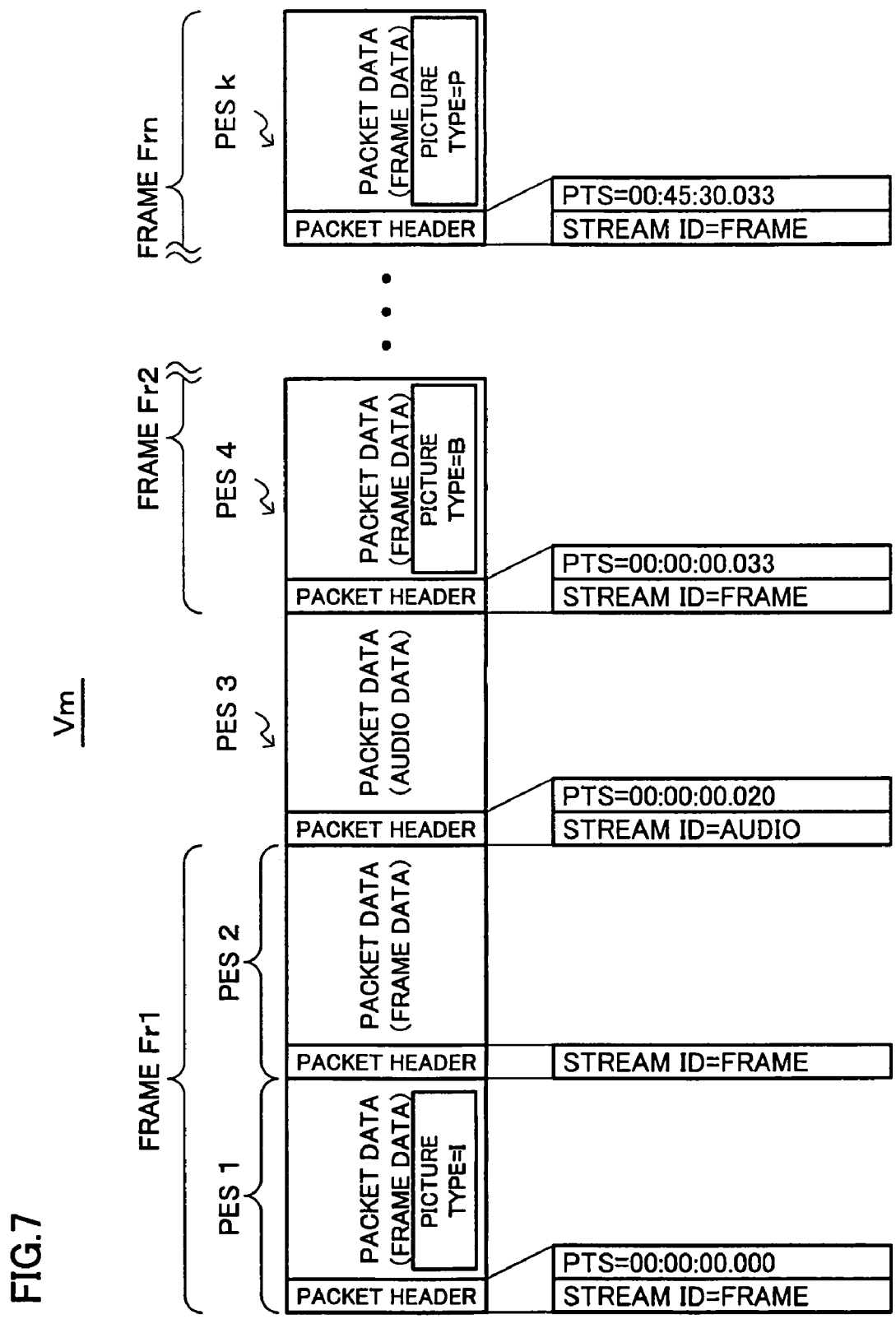
FIG. 7 is a schematic view for use in illustration of frame information producing processing in step S305 in FIG. 6.

Referring to FIG. 7, the moving picture data Vm in the HDD 14 is multiplexed together with audio sound data (hereinafter as "audio data") corresponding to the moving picture data Vm and formed into a plurality of PES packets (hereinafter as "PES") 1 to PES k (k: natural number).

Since data in one frame Fr is large and therefore divided into a plurality of PESs. In FIG. 7, the frame Fr1 is divided into PES 1 and PES 2. The moving picture Vm stored in the HDD 14 is multiplexed by MPEG2 and includes both PESs having frame data and PESs having audio data. In FIG. 7, a PES 3 having audio data is provided between the PES 2 having the data of frame Fr1 and a PES 4 having the data of frame Fr2.

The PESs each have a PES packet header (hereinafter as "header") at the beginning followed by packet data. The header stores information related to the PES. More specifically, the header basically includes a stream ID and a PTS (Presentation Time Stamp). The stream ID indicates whether the packet data of the PES is frame data or audio data. The PTS is time information representing the reproducing time of the frame. Note that the frame Frn is made of a plurality of packets, and therefore the packets other than the starting packet of the frame Fr have no PTS at their headers. For example, the header of the PES 2, one of the packets of the frame Fr1 does not have PTS. When the header of the PES whose stream ID=frame data has a PTS, the packet data of the PES includes picture type data.

In view of the data structure of the moving picture Vm as described above, the producing processing in step S305 in FIG. 6 will be described.

Producing Processing

Figure 8:
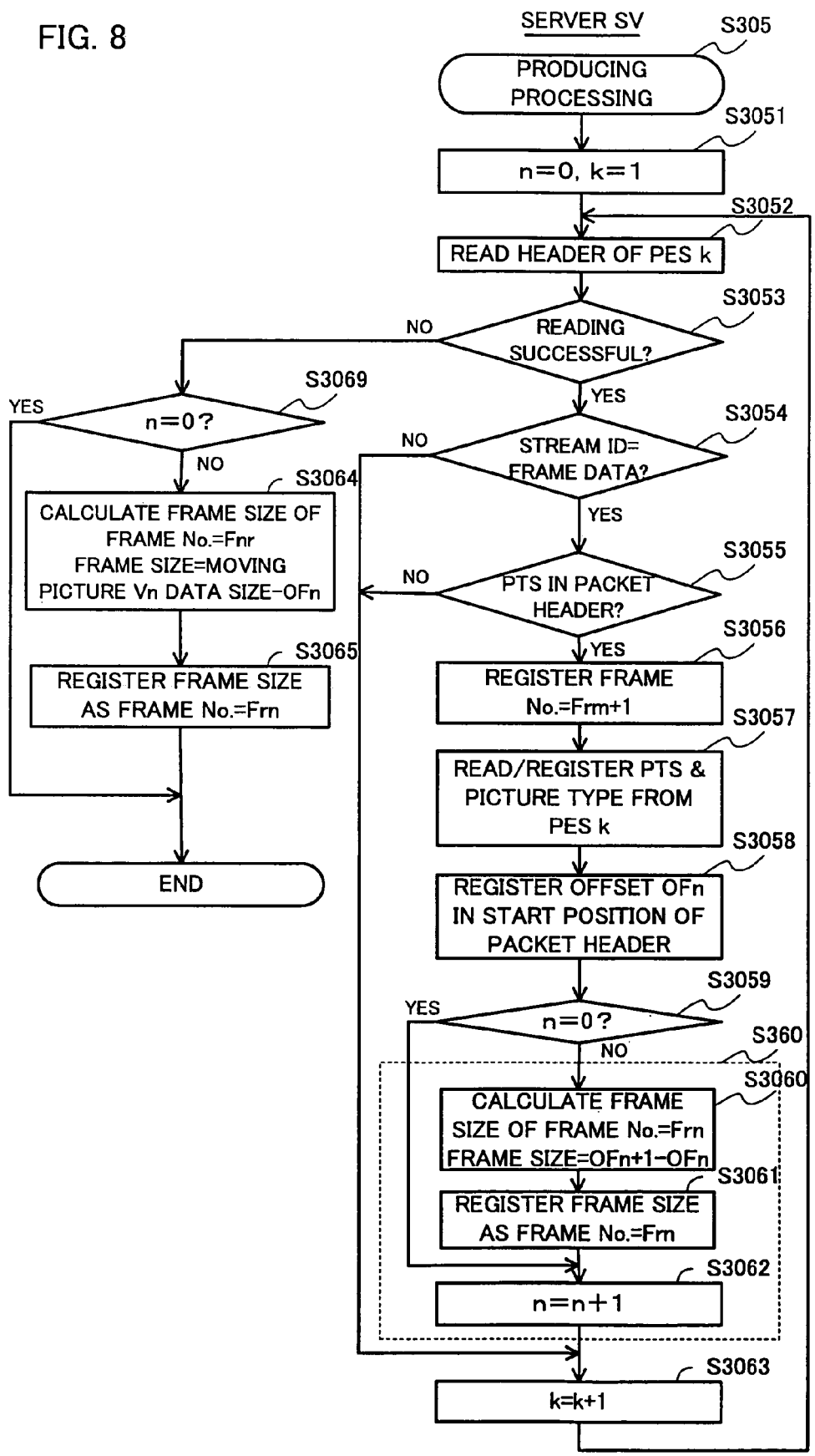
FIG. 8 is a flowchart for use in illustration of frame information producing processing in step S305 in FIG. 6.

With reference to FIGS. 7 and 8, the server SV initially sets the count value n for the frame No. to 0 (n=0) and the count value k for PES to 1 (k=1)(k: natural number)(S3051). The server SV then reads out the header of the PES 1 among the plurality of PESs constituting the moving picture Vm selected by the user (S3052). At the time, the server SV successfully reads out the header of the PES 1 (S3503). The server SV determines whether the stream ID of the read out header is frame data or audio data (S3054). At the time, the server SV determines that the stream ID of the PES 1=frame data.

The server SV then determines whether a PTS exists in the header (S3055). At the time, the server SV determines that a PTS exists in the header of the PES 1.

If the stream ID indicates frame data and a PTS exists in the header, the server SV registers frame No.=Frn+1=Fr1 in the search table STm (S3056) as shown in Table 5 and registers the PTS corresponding to the frame Fr1 as the time. The PES 1 having the PTS includes picture type=I in the packet data, and therefore the picture type=I is registered as the picture type (S3057). The server SV registers the offset OF1 of the starting position of the header of the PES 1 (S3508).

TABLE 5 search table STm

| | | frame information | | |
|---|---|---|---|---|
| frame No. | time | offset | size | picture type |
| Fr1 | 0:00:00.000 | 0x00001000 | | I |

After registering the offset OF1, if the count value n for the frame No.=0 (S3059), the count value n is incremented (n=1) in step S3062, the count value k is incremented (k=2) in step S3063, and the process returns to step S3052.

Then, the server SV reads out the header of the PES 2 (S3052, S3053). Here, the PES 2 is a packet that is part of the frame Fr1 like the PES 1 and therefore does not have a PTS. Therefore, the server SV determines that the stream ID indicates frame data in step S3054 but the server also determines in step S3055 that there is no PTS. Consequently, the server SV increments the count value k to 3 (k=3)(S3063), and the process returns to step S3052.

Then, the server SV reads out the header of the PES 3 (S3052, S3053). The server SV determines that the PES 3 is audio data based on the result of determination in step S3054. Consequently, the server SV sets the count value k to 4 (k=4) (S3063), and the process returns to the operation in step S3052.

When the header of the PES 4 is read out, the stream ID in the header of the PES 4 indicates frame data (S3054), and it is determined that there is a PTS (S3055). As given in Table 6, the server SV registers frame ID=Frn+1=Fr2 as the frame information (S3056), registers the PTS and the picture type (S3057), and registers the offset OF2 (S3058).

TABLE 6 search table STm

| | | frame information | | |
|---|---|---|---|---|
| frame No. | time | offset | size | picture type |
| Fr1 | 0:00:00.000 | 0x00001000 | | I |
| Fr2 | 0:00:00.033 | 0x00004000 | | B |

Since the count value n of the frame No. at the time is 1 (n=1) (S3059), the server SV carries out frame size calculating processing (S360). More specifically, using the offsets OF2 and OF1, the data size of the frame Fr1 is calculated according to the expression (1)(S3060).

The data size of frame $Frn=OFn+1-OFn$ (1)

The data size of frame $Fr1=OF2-OF1$

The calculated data size is registered as the size of the frame Fr1 in the frame information as given in Table 7 (S3061).

TABLE 7 search table STm

| | | frame information | | |
|---|---|---|---|---|
| frame No. | time | offset | size | picture type |
| Fr1 | 0:00:00.000 | 0x00001000 | 0x00003000 | I |
| Fr2 | 0:00:00.033 | 0x00004000 | | B |

After carrying out the frame size calculating processing (S360), the count value n is incremented to 2 (n=2)(S3062), the count value k is set to 5 (k=5)(S3063), and then the process returns to step S3052 to start the processing in the same manner.

As the result of the processing, after the server SV carries out the processing of producing the PES k that is the final PES packet in the moving picture Vm, if the process returns to step S3052 and attempts to read out a header, there is no PES after the PES k, and therefore the server SV fails to read out the header (S3053). In this case, if the count value is not 0 (S3069), all the PESs of the moving picture Vm have been read out, and therefore the server SV calculates the frame size of the final frame Frn according to the expression (2)(S3064).

The data size of frame $Frn$=the size of moving picture data $Vm-OFn$ (2)

The calculated frame size is registered as the size of the frame Frn in the search table STm (S3065), and the search table STm is thus complete. Consequently, the server SV ends the producing processing.

By the above described operation, upon receiving a moving picture distribution request from a client, the server SV determines whether the search table STm of the moving picture data Vm desired by the client exists, and if there is no such search table, the search table STm is quickly produced.

1. 2. 3. Special Reproducing Operation

Figure 9:
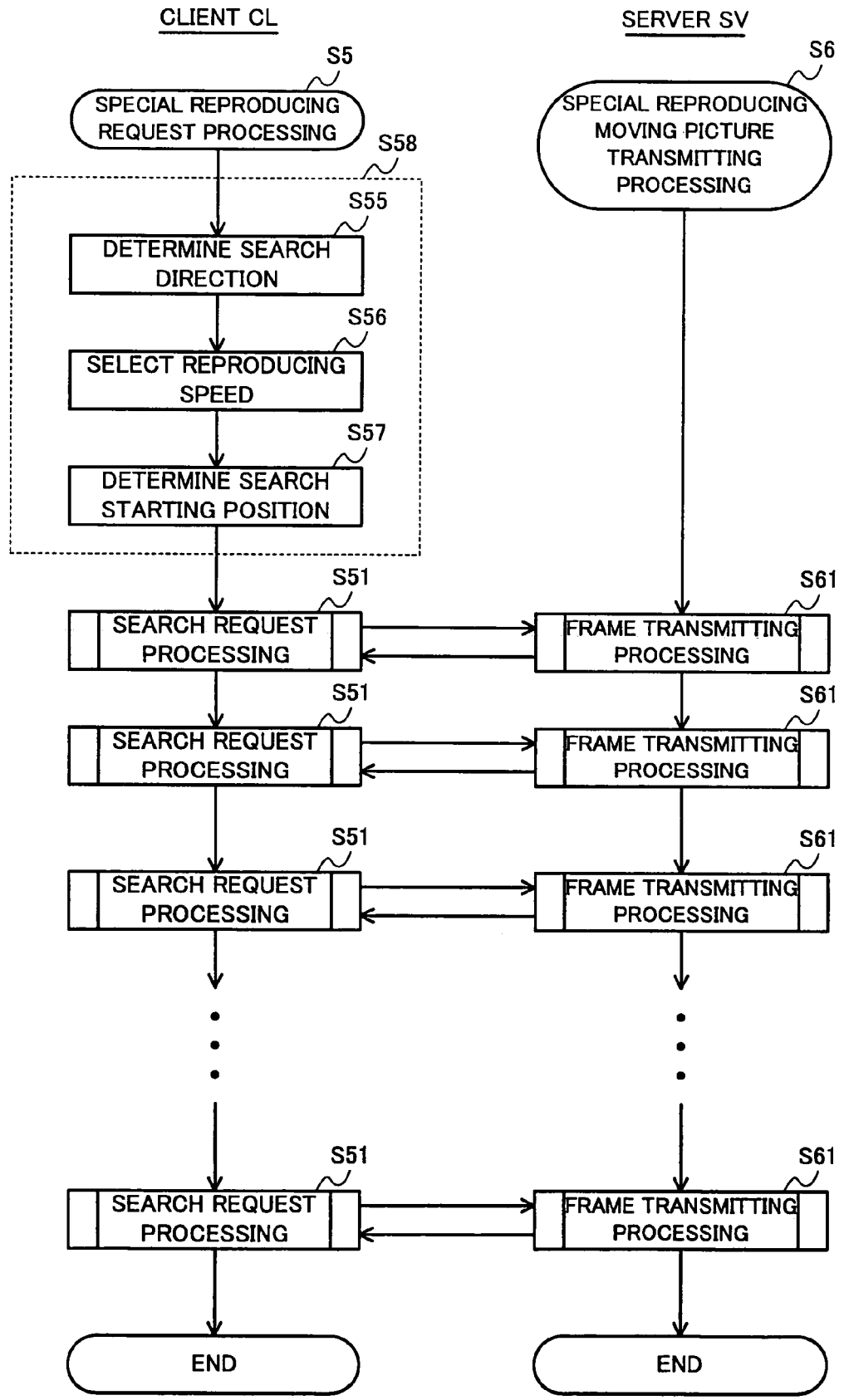
FIG. 9 is a flowchart for use in illustration of special reproducing request processing and special reproducing moving picture transmitting processing in FIG. 5.

Referring to FIG. 9, the user of the client CL selects fast-forward reproducing while the client CL is in the process of reproducing a moving picture based on the moving picture data Vm, the client CL produces a search request as given in Table 8 (S58).

TABLE 8

| request content | |
|---|---|
| search request command | |
| search starting position | OFn = 0x00800000 |
| frame condition | I picture |
| search direction | fast-forwarding |

The search request includes the search starting position, the frame condition, and the search direction. The search starting position is the offset OFn of the frame Frn from which the search is started. The frame condition is the picture type (I, B, P) of the frame Frn searched by the server SV. The search direction indicates fast-forwarding or reversing.

When the search request is produced, the client CL initially determines the search direction as the fast-forwarding direction in response to the operation of the user (S55). The client CL then selects a reproducing speed in response to the operation of the user and determines the frame condition based on the selected speed (S56).

The frame condition is determined based on a fast-forward reproducing speed table as given in Table 9. Note that the fast-forward reproducing speed table is stored in the memory 32 of the client CL.

TABLE 9 fast-forward reproducing speed table

| fast-forward reproducing speed | frame condition |
|---|---|
| normal | frame condition for j-th search request: I picture |
| double speed | frame condition for j-th search request: 2j-th I picture |
| triple speed | frame condition for j-th search request: 3j-th I picture |

The frame conditions corresponding to the fast-forward reproducing speeds are recorded in the fast-forward reproducing speed table. At a normal fast-forwarding speed, for example, the frame condition to be included in the j-th search request (j: natural number) is I picture. Meanwhile, for double speed, the frame condition to be included in the j-th search request is I picture the 2j-th from the frame Frn in the search starting position. For triple speed, the frame condition to be included in the j-th search request is I picture the 3j-th from the frame Frn in the search starting position.

The client CL selects a fast-forwarding speed in response to the operation of the user, and the frame condition is determined based on the fast-forwarding speed table. When the user selects the normal fast-forward reproducing speed, the client CL determines the frame condition as "I picture" in response to the operation of the user based on the fast-forward reproducing speed table.

Then, the client CL determines the search starting position in the search request (S57). More specifically, the client CL determines as the search starting position the offset OFn of the frame of the moving picture displayed at the display of the client CL (that is not shown) at the time of transmitting the search request. By these process steps S55 to S57, the search request is produced (S58).

After producing the search request, the client CL transmits the search request to the server SV and obtains the frame Frn necessary for fast-forward reproducing (search request processing: S51). Meanwhile, the server SV transmits the frame Frn corresponding to the search request (frame transmitting processing: S61).

While the user selects fast-forward reproducing, the client CL continues to carry out the search request processing (S51), and the server SV continues to carry out the frame transmitting processing (S61) corresponding to the search request processing. As a result, the client CL can carry out fast-forward reproducing. Now, the search request processing and the frame transmitting processing will be described.

Figure 10:
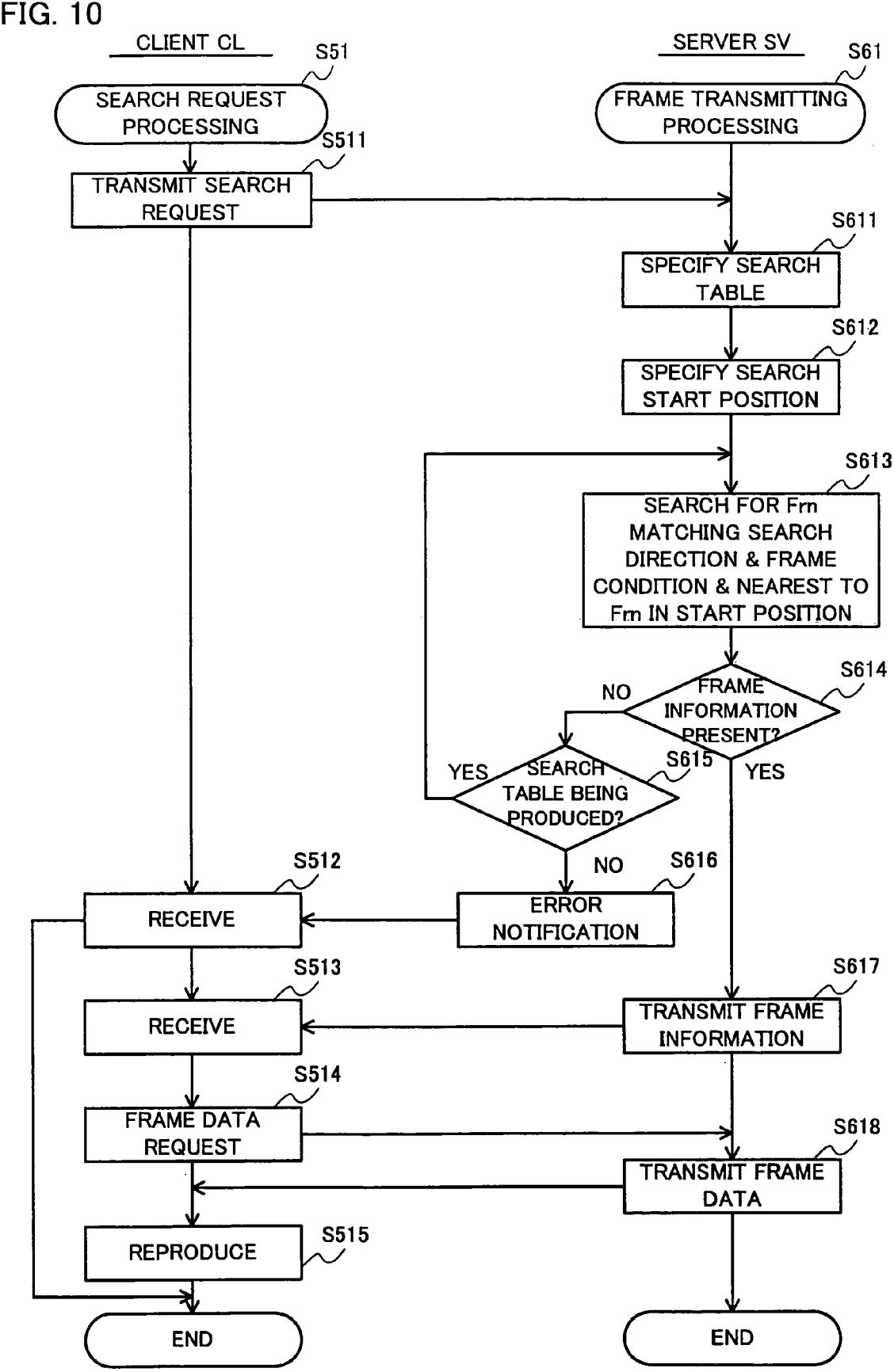
FIG. 10 is a flowchart for use in illustration of search request processing and frame transmitting processing in FIG. 9.

Referring to FIGS. 10 and 11, when the user selects fast-forward reproducing, the client CL transmits the search request that has produced (S511).

The server SV, upon receiving the search request, specifies the search table STm for the moving picture data Vm being distributed to the client CL (S611). More specifically, the server SV refers to the client information CLI of the client CL that has transmitted the search request, and specifies the search table STm from the registered search table ID (S611). Then, the server SV specifies the frame Frn to start searching based on the search starting position in the search request (S612). The search starting position in the search request is "0x00800000" and therefore the server SV determines the frame Fr50 as the search starting position.

Then, the server SV searches for frames Fr to be transmitted to the client CL (S613). More specifically, the server SV searches for the frames Fr whose picture type is I picture arranged after and the nearest to the frame Fr50 based on the frame condition (I picture) and the search direction (fast-forwarding) in the search request. As the result of the search, the server SV founds the frame Fr 52 (S614).

At the time, the server SV transmits the frame information of the frame Fr 52 to the client CL (S617). The client CL receives the frame information (S513), and requests for the data of a frame Fr52 (S514). The server SV responds to the request from the client CL to transmit the data of frame Fr52 (S618). The client CL receives the data of the frame Fr52 and reproduces a moving picture based on the frame Fr 52 (S515).

After receiving the moving picture based on the frame Fr52, the client CL again carries out search request processing (S51). At the time, the client CL transmits a search request in which the offset OF52 of the frame Fr52 is the search starting position and the frame condition and the search direction are the same as those of the previous search request (S511). In this way, the client CL continuously obtains frames Fr of I picture and can carry out fast-forward reproducing by reproducing a moving picture based on the frames Fr.

Note that in the frame transmitting processing (S61), if the frame information of the frame Frn corresponding to the search request does not exist based on the result of the search in step S613 (S614), it is determined whether the search table STm is being produced (S615). This is because the server SV could receive a search request from the client CL when the server is in the process of transmitting moving picture data Vm that has never been transmitted to the client while producing a search table STm in response to a moving picture distribution request from the client CL for the moving picture data Vm.

As the result of the determination in step S615, if the server SV is in the process of producing the search table STm, the process returns to step S613, and the search is repeated. While the search goes on, the frame information of the frame Frn is registered in the search table STm.

Meanwhile, as the result of the determination, if the server SV is not in the process of producing the search table STm, the server SV transmits an error notification to the client CL (S616). If for example the search starting position is Fr1 and the search direction is the reversing direction, no frame Fr (frame information) exists before the frame Fr1, and therefore the server SV transmits an error notification. In this case, the client CL ends the operation upon receiving the error notification (S512).

In the above description, the user selects fast-forward reproducing, while the above applies when the user selects reverse-reproducing. If for example the search starting position in the search request from the client CL is the offset OF73 of the frame 73, the picture type is I picture, and the search direction is the reversing direction, the server SV searches for the frame Fr72 in step S613.

2. Second Embodiment

According to the first embodiment, the server SV searches for moving picture data Vm to be distributed to the client CL using the search table STm, while the server SV may directly search for moving picture data Vm in the database DB in the HDD 14 without using the search table STm.

The server SV in the network AV system according to a second embodiment of the invention does not have the search table STm. The other structure is the same as that of the network AV system 1 shown in FIGS. 1 to 3.

2. 1. General Operation

Figure 12:
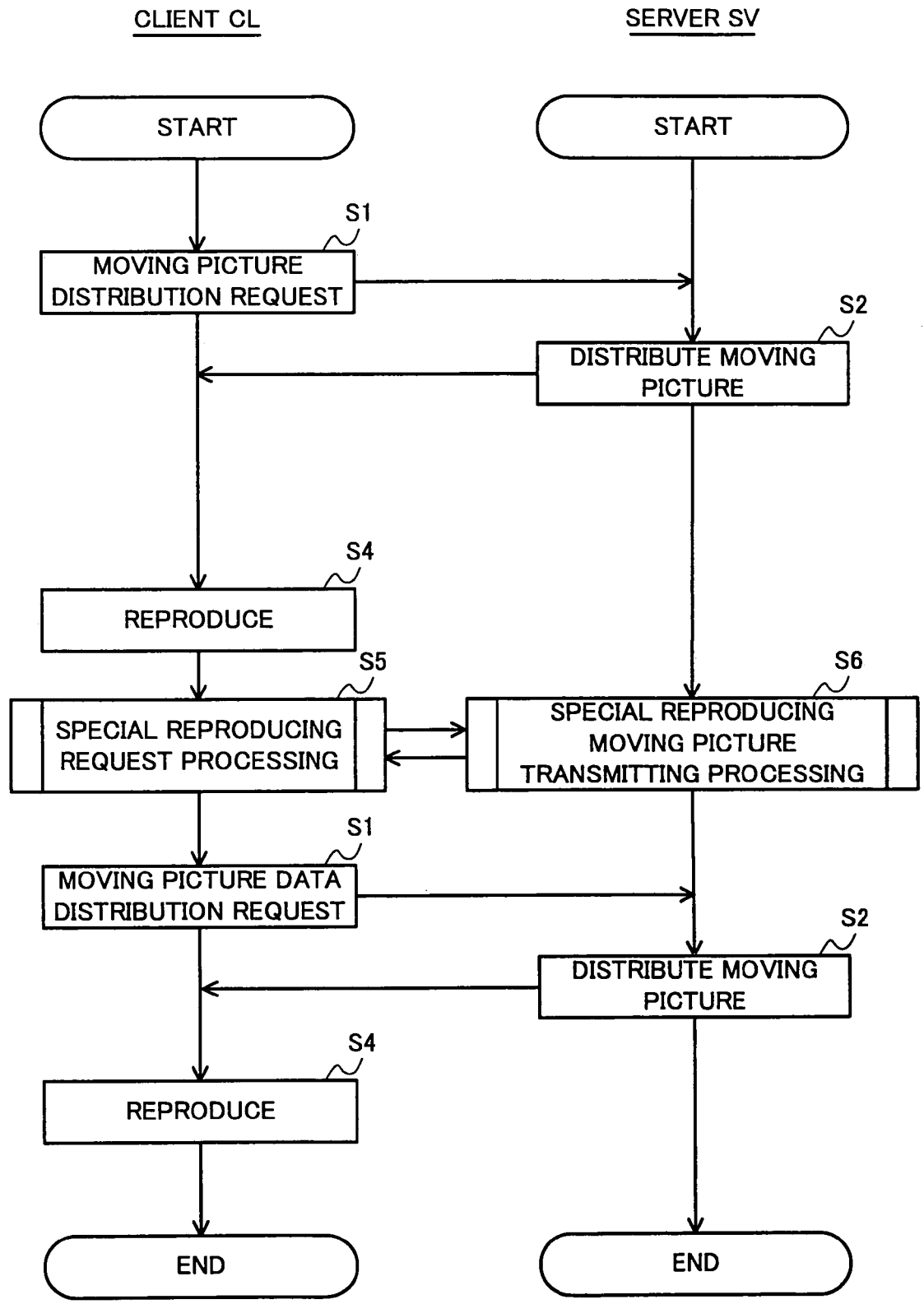
FIG. 12 is a flowchart for use in illustration of the operation of a network AV system according to a second embodiment of the invention.

FIG. 12 shows the general operation according to the embodiment. As compared to FIG. 5, the search table producing processing in step S3 in FIG. 5 is not carried out. More specifically, the server SV does not produce a search table STm. The operation in steps S5 and S6 in FIG. 12 are shown in FIG. 13.

Figure 13:
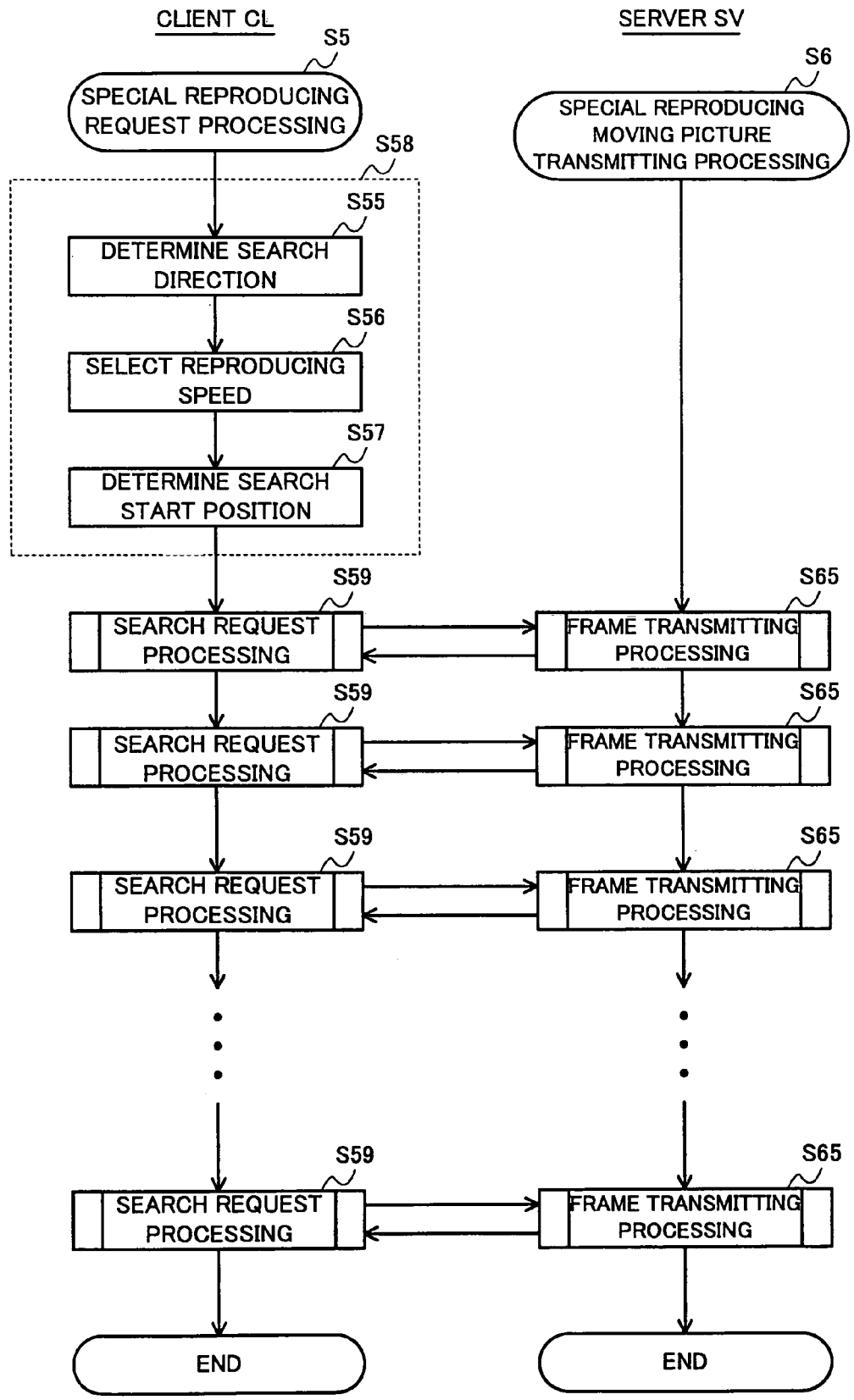
FIG. 13 is a flowchart for use in illustration of special reproducing request processing and special reproducing moving picture transmitting processing in FIG. 12.

Referring to FIG. 13, the search request processing (S59) by the client CL and the frame transmitting processing (S65) by the server SV are different from those in FIG. 9. The other operation is the same as that shown in FIG. 9.

Now, the search request processing and the frame transmitting processing according to the embodiment will be described.

Figure 14:
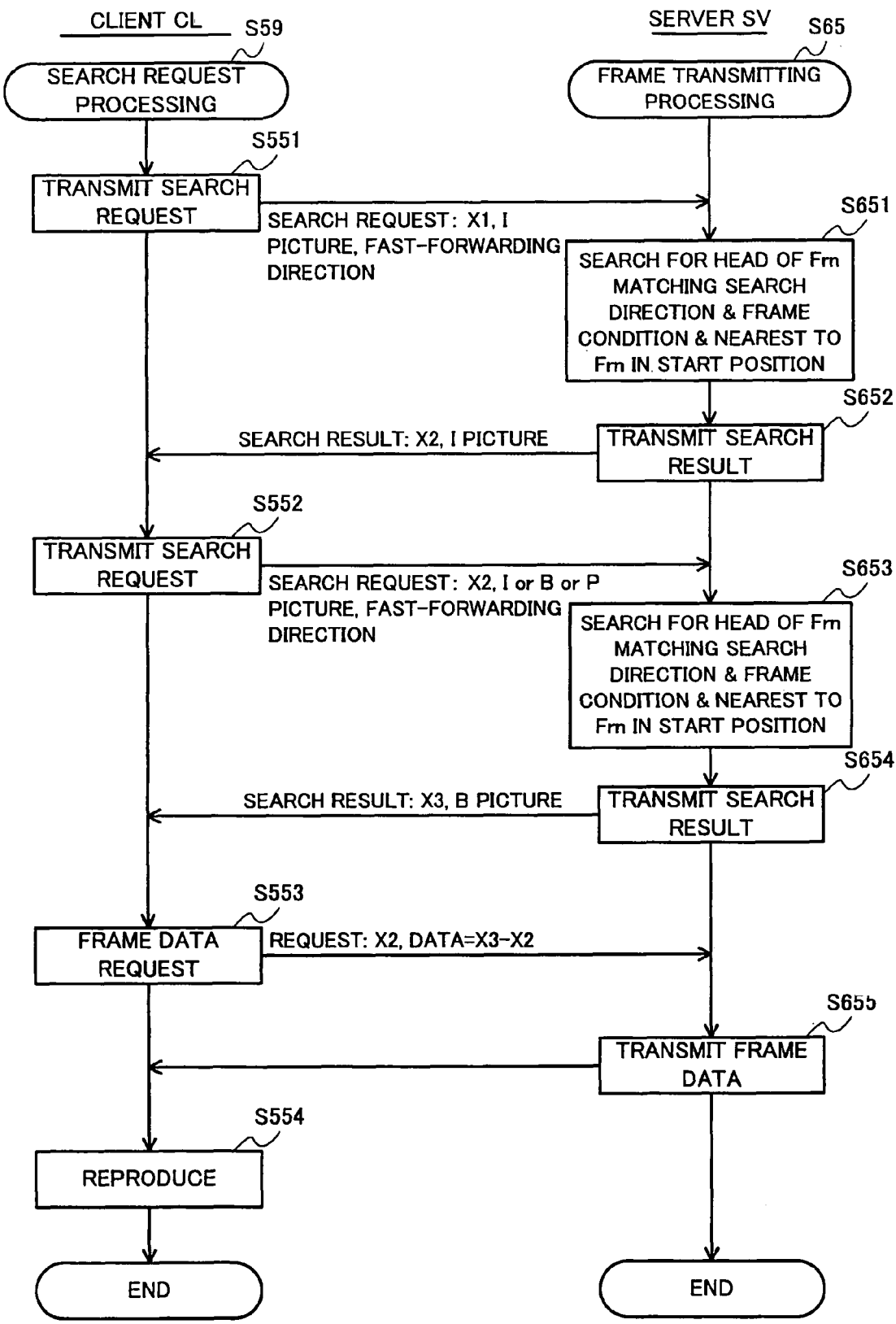
FIG. 14 is a flowchart for use in illustration of search request processing and frame transmitting processing in FIG. 13.
Figure 15:
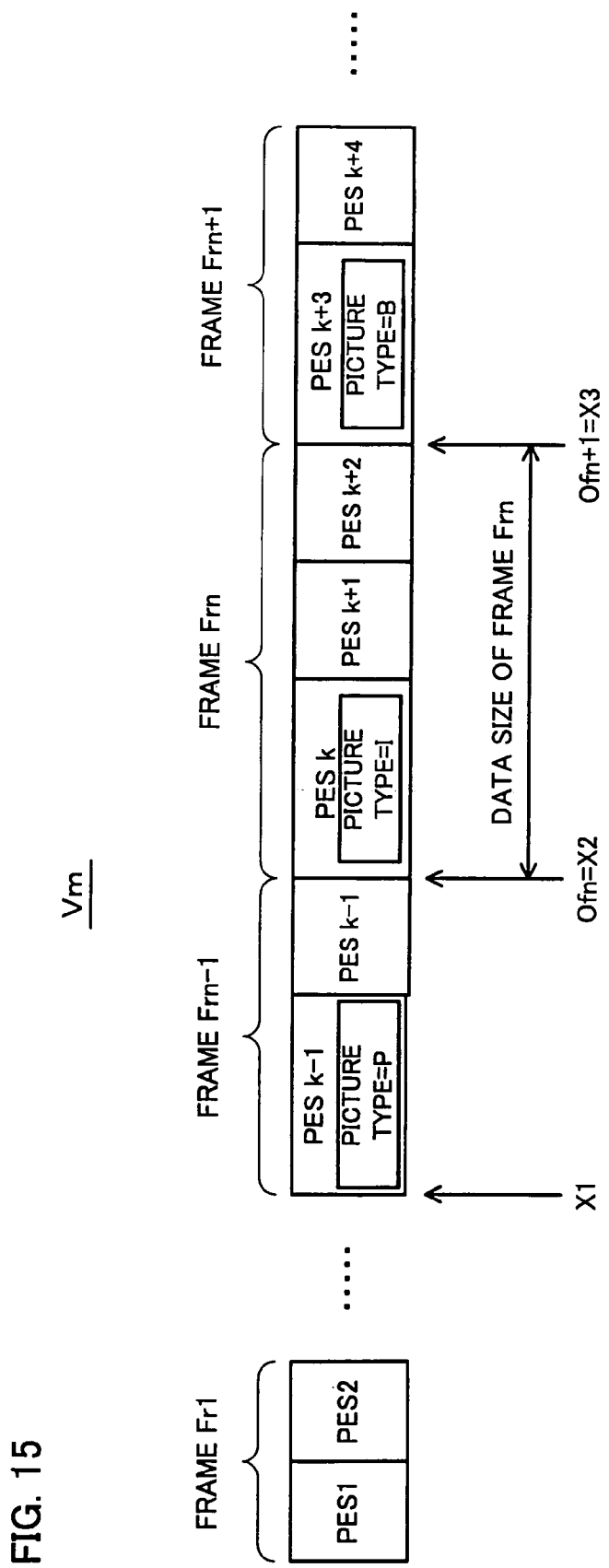
FIG. 15 is a schematic view for use in illustration of frame transmitting processing in FIG. 13.
Figure 16:
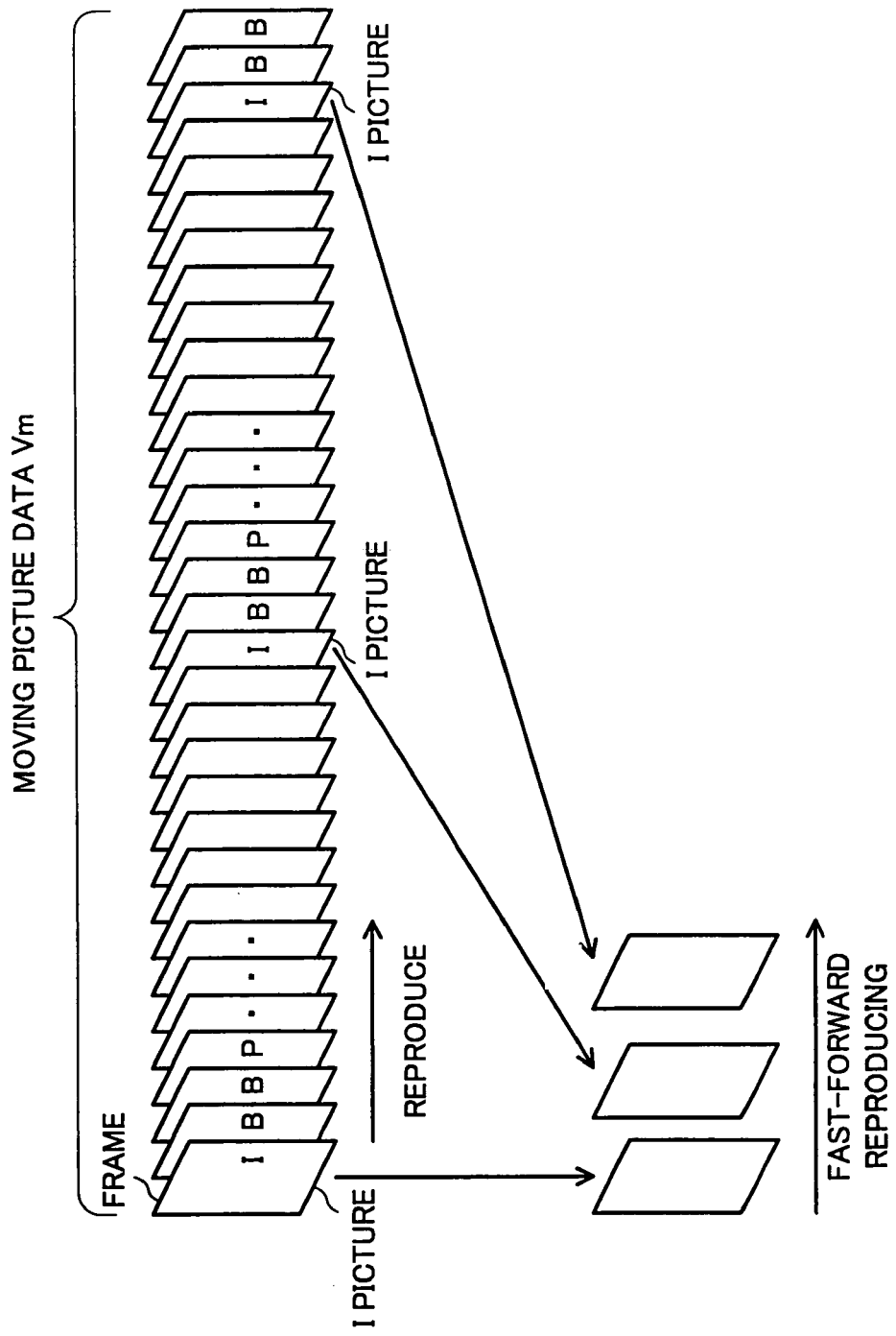
FIG. 16 is a schematic view for use in illustration of a special reproducing method using a conventional moving picture reproducing device.

Referring to FIGS. 14 and 15, when the user selects fast-forward reproducing, the client CL transmits a search request (S551). The search request transmitted at the time is given in Table 10.

TABLE 10

| request content |  |
| --- | --- |
| search request command |  |
| search starting position | OFn = X1 |
| frame condition | I picture |
| search direction | fast-forwarding |

The server SV, upon receiving the search request in Table 10, searches for moving picture data Vm in the database DB (S651). At the time, the server SV searches for the starting position of the frame Frn according to the search request. More specifically, the server SV starts to search for the search starting position "X1" in the search request and then searches for the offset OFn=X2 in the starting position of the PES k including the picture type=I in the packet data. After the search, the server SV transmits the offset OFn=X2 and the picture type=I of PES k found by the search as the result of the search (S652).

The client CL, upon receiving the search result, transmits a search request as given in Table 11 (S552).

TABLE 11

| request content |  |
| --- | --- |
| search request command |  |
| search starting position | OFn = X2 |
| frame condition | I, B, or P picture |
| search direction | fast-forwarding |

Referring to Table 11, the search starting position is "X2." The frame condition is any of the picture types I, B, and P. More specifically, the client CL requests the server SV to search for the starting position of a PES including any of the picture types I, B, and P starting from the offset OFn=X2.

The server SV, upon receiving the search request in Table 11, starts to search based on the request and searches for the offset OFn+1=X3 in the starting position of the PES k+3 including the picture type=B in the packet data (S653). After the search, the server SV transmits the result of the search including the offset OFn+1=X3 in the starting position of the PES k+3 and the picture type=B found by the search to the client CL (S654).

The client CL, upon receiving the search result, requests the server SV to provide the data of the frame Frn of I picture (S553). At the time, the client CL requests the server SV to transmit the data whose data obtaining start position is X2, and whose size is X3−X2.

The server SV, upon receiving the data request, transmits the data having X2 as the data obtaining start position and a size equal to X3−X2, in other words, the data of the frame Frn to the client CL (S655).

The client CL reproduces a moving picture based on the frame Frn, upon receiving the data of the frame Frn (S554).

By these operation steps, the server SV responds to the search request from the client CL to search for the starting position of the frame Frn and the starting position of the succeeding frame Frn+1. The client CL specifies the data size of the frame Frn to be transmitted based on the difference between the two starting positions found by the search, and the server SV transmits the frame Frn to the client CL. Therefore, the server SV can sequentially transmit frames Frn in response to the search request from the client CL without producing a search table STm. In this way, the client CL can carry out special reproducing.

According to the first and second embodiments, the moving picture data Vm is in the form of MPEG1 or MPEG2-PS, while the data may be in the form of MPEG2-TS (Transport Stream) or any other MPEG form.

Although the present invention has been described and illustrated in detail, it is clearly understood that the same is by way of illustration and example only and is not to be taken by way of limitation. The invention may be embodied in various modified forms without departing from the spirit and scope of the invention.

What is claimed is:

1. A network AV system comprising a server and a client capable of connecting to said server, said server comprising:

a moving picture storage device capable of storing moving picture data including a plurality of frames arranged in sequence;

a searcher searching said moving picture storage device for one frame every time said server receives a search request transmitted from said client while said client carries out fast forward reproducing or reverse reproducing at a given reproducing speed; and a transmitter transmitting the one frame found by said searcher, said client comprising:

a receiver receiving the transmitted frame;

a reproducer reproducing a moving picture based on the received frame; and a search requester transmitting the search request to said server every time said receiver receives the transmitted frame while said client carries out fast forward reproducing or reverse reproducing at the given reproducing speed.

2. The network AV system according to claim 1, wherein said transmitter further transmits a frame information of the frame found by said searcher to said client, said search requester further requests the frame of the received frame information, and said transmitter transmits the frame in response to the request from said search requester.

3. The network AV system according to claim 1, wherein the search request includes a search starting position that indicates a position of the frame that said server starts to search for, and said search requester transmits the search request including the position of the already received frame as the search starting position to said server every time said receiver receives the transmitted frame.

4. The network AV system according to claim 1, wherein the search request includes a frame condition of the frame to be searched for, and/or a frame search direction.

5. The network AV system according to claim 1, wherein said server further comprises a table storage device capable of storing a search table in which the positions of the plurality of frames correspond to frame information related to the plurality of frames, and
said searcher searches said moving picture storage device for a frame according to the search request based on the search table.

6. The network AV system according to claim 1, wherein said client further comprises a reproducing speed selector selecting a reproducing speed of the moving picture,
the search request includes a frame condition of the frame to be searched for, and
said search requester determines the frame condition to be included in the search request based on the reproducing speed selected by said reproducing speed selector.

7. The network AV system according to claim 5, wherein the frame information includes picture types of the plurality of frames, and
the search request includes the picture type of the frame to be searched for.

8. A server capable of connecting to a client, comprising:
a moving picture storage device capable of storing moving picture data including a plurality of frames arranged in sequence;
a receiver receiving a search request transmitted from said client while said client carries out fast forward reproducing or reverse reproducing at a given reproducing speed;
a searcher searching said moving picture storage device for one frame every time said server receives the search request; and
a transmitter transmitting the one frame found by said searcher to said client every time said receiver receives the search request.

9. The server according to claim 8, further comprising a table storage device capable of storing a search table in which positions of the plurality of frames correspond to frame information related to the plurality of frames, and
said searcher searches said moving picture storage device for a frame according to the search request based on the search table.

10. A client capable of connecting to a server storing moving picture data having a plurality of frames arranged in sequence, said client comprising:
a receiver receiving one frame transmitted by said server every time said server receives a search request transmitted from said client while said client carries out fast forward reproducing or reverse reproducing;
a reproducer reproducing a moving picture based on the received frame; and
a search requester transmitting a search request to said server every time said receiver receives the transmitted frame while said client carries out fast forward reproducing or reverse reproducing at a given reproducing speed.

11. The client according to claim 10, wherein
said receiver further receives a frame information of the frame found by said server in response to receipt of the search request, and
said search requester further requests said server for the frame of the received frame information.

12. The client according to claim 10, wherein
the search request includes a search starting position that indicates a position of the frame that said server starts to search for, and
said search requester transmits a search request including the position of the already received frame as the search starting position every time said receiver receives the transmitted frame.

13. The client according to claim 10, further comprising a reproducing speed selector selecting a reproducing speed of the moving picture, wherein
said search request includes a frame condition of the frame to be search for, and
said search requester determines the frame condition to be included in the search request based on the reproducing speed selected by said reproducing speed selector.

14. A computer program stored on a computer-readable medium causing a server capable of connecting to a client to perform the steps of:
storing moving picture data including a plurality of frames arranged in sequence in a moving picture storage device;
receiving search a request transmitted from said client while said client carries out fast forward reproducing or reverse reproducing at a given reproducing speed;
searching said moving picture device for one frame every time said server receives the search request; and
transmitting the one frame found by the search to said client every time receiving the search request from said client.

15. The computer program according to claim 14, further causing said server to perform the step of storing a search table in which positions of the plurality of frames correspond to frame information related to the plurality of frames in a table storage device, wherein
said step of searching searches said moving picture storage device for a frame corresponding to the search request based on the search table.

16. A computer program stored on a computer-readable medium causing a client capable of connecting to a server storing moving picture data having a plurality of frames arranged in sequence to perform the steps of:
receiving one frame transmitted by said server every time said server receives a search request transmitted from said client while said client carries out fast forward reproducing or reverse reproducing;
reproducing a moving picture based on the received frame; and
transmitting a search request of the frame to said server every time receiving the transmitted frame while said client carries out fast forward reproducing or reverse reproducing at a given reproducing speed.

17. The computer program according to claim 16, further causing said client to perform the steps of:
receiving a frame information of the frame found by said server; and
requesting said server for the frame of the received frame information.

18. The computer program according to claim 16, wherein
the search request include a search starting position that indicates a position of the frame that said server starts to search for, and
said step of transmitting transmits a search request including the position of the already received frame as the search starting position every time said step of receiving receives the transmitted frame.

19. The computer program according to claim 16, further causing said client to perform the step of selecting a reproducing speed of the moving picture, wherein said search request includes a frame condition of the frame to be searched for, and said step of transmitting determines the frame condition to be included in the search request based on the selected reproducing speed.

20. The server according to claim 8, wherein said transmitter further transmits a frame information of the frame found by said searcher to said client, and transmits the frame of the frame information in response to the request of the frame from said client.

21. The computer program according to claim 14, further causing said server to perform the steps of:

transmitting a frame information of the frame found by the search to said client; and transmitting the frame of the frame information in response to the request of the frame from said client.

* * * * *